(12) United States Patent
Morita

(10) Patent No.: US 9,832,699 B2
(45) Date of Patent: Nov. 28, 2017

(54) COMMUNICATION CONTROL METHOD, USER TERMINAL, CELLULAR BASE STATION, AND ACCESS POINT

(71) Applicant: KYOCERA CORPORATION, Kyoto (JP)

(72) Inventor: Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/338,107

(22) Filed: Oct. 28, 2016

(65) Prior Publication Data

US 2017/0048777 A1  Feb. 16, 2017

Related U.S. Application Data

(63) Continuation of application No. 14/786,732, filed as application No. PCT/JP2014/060593 on Apr. 14, 2014.

(30) Foreign Application Priority Data

Apr. 25, 2013 (JP) ................................ 2013-092181

(51) Int. Cl.
  *H04W 4/00* (2009.01)
  *H04W 36/22* (2009.01)
  (Continued)

(52) U.S. Cl.
  CPC ......... *H04W 36/22* (2013.01); *H04L 61/6022* (2013.01); *H04W 12/06* (2013.01);
  (Continued)

(58) Field of Classification Search
  CPC ... H04W 36/00; H04W 36/005; H04W 36/08; H04W 72/0406
  See application file for complete search history.

(56) References Cited

U.S. PATENT DOCUMENTS 8,750,877 B2   6/2014 Shinojima
2010/0138661 A1*  6/2010 Tsai ...................... H04L 9/0844
                                                                   713/171
(Continued)

FOREIGN PATENT DOCUMENTS

| JP | 2007-235494 A | 9/2007 |
| JP | 2013-70216 A | 4/2013 |
| WO | 2011/157152 A2 | 12/2011 |

OTHER PUBLICATIONS

3GPP TSG-RAN Meeting #57, "New Study Item Proposal on WLAN/3GPP Radio Interworking", RP-1201455, 2012, 5 pages, Chicago, USA.

(Continued)

*Primary Examiner* — Kevin C Harper
(74) *Attorney, Agent, or Firm* — Studebaker & Brackett PC

(57) ABSTRACT

A communication control method according to a first aspect is a method for performing offloading to switch traffic to be transmitted and received between a user terminal and a cellular base station to a wireless LAN system. The communication control method comprises: a step A in which the user terminal transmits a wireless LAN terminal identifier being an identifier of the user terminal in the wireless LAN system, to the cellular base station; and a step B in which the cellular base station, before performing the offloading, transmits the wireless LAN terminal identifier received from the user terminal to an access point of the wireless LAN system. The wireless LAN terminal identifier is used for wireless authentication of the user terminal at the access point.

6 Claims, 8 Drawing Sheets

(51) Int. Cl.
  *H04W 12/06* (2009.01)
  *H04W 36/14* (2009.01)
  *H04W 76/02* (2009.01)
  *H04L 29/12* (2006.01)
  *H04W 84/12* (2009.01)
  *H04W 88/06* (2009.01)
  *H04W 92/20* (2009.01)
  *H04W 88/04* (2009.01)

(52) U.S. Cl.
  CPC ......... *H04W 36/14* (2013.01); *H04W 76/021* (2013.01); *H04W 84/12* (2013.01); *H04W 88/04* (2013.01); *H04W 88/06* (2013.01); *H04W 92/20* (2013.01)

(56) References Cited

U.S. PATENT DOCUMENTS

| | | |
|---|---|---|
| 2011/0223885 A1 | 9/2011 | Salkintzis et al. |
| 2014/0029570 A1* | 1/2014 | Lee ............... H04W 36/0005 370/331 |
| 2014/0071925 A1 | 3/2014 | Liu |
| 2014/0098789 A1* | 4/2014 | Liu ............... H04W 76/02 370/331 |
| 2014/0204927 A1* | 7/2014 | Horn ............. H04W 8/26 370/338 |
| 2015/0250013 A1* | 9/2015 | Li ............... H04W 72/0426 370/312 |

OTHER PUBLICATIONS

International Search Report and Written Opinion from PCT/JP2014/060593 dated Jul. 1, 2014.

The extended European search report issued by the European Patent Office dated Oct. 10, 2016, which corresponds to European Patent Application No. 14789001.6-1854 and is related to U.S. Appl. No. 14/786,732.

JP Office Action from corresponding JP Appl No. 2013-092181 dated Nov. 15, 2016, with concise statement of relevance, 5 pp.

* cited by examiner

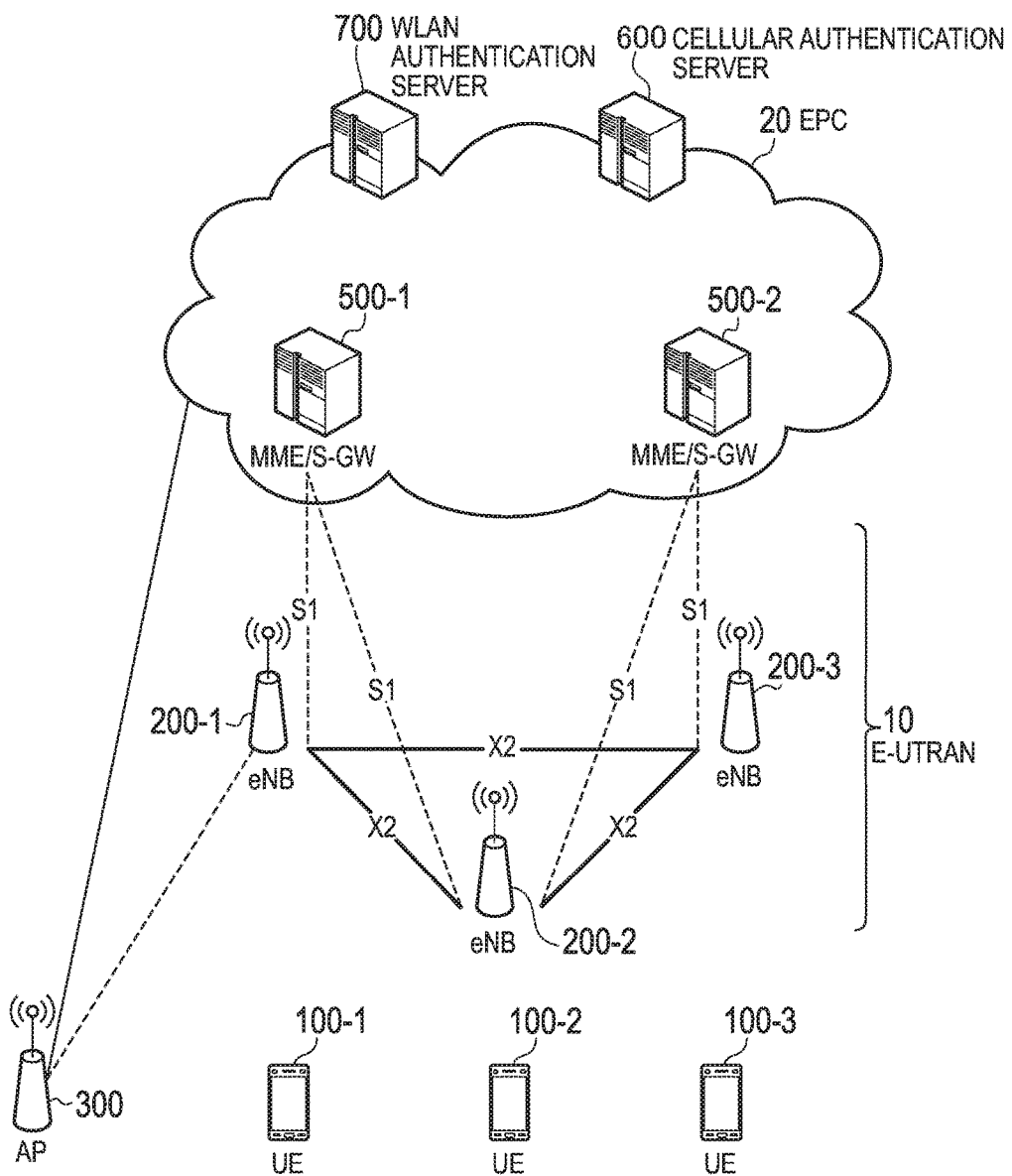

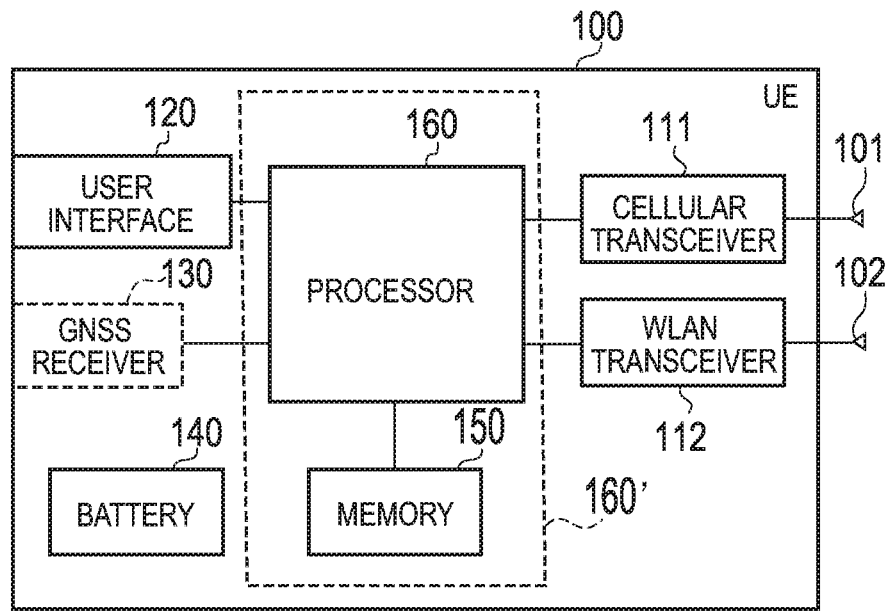
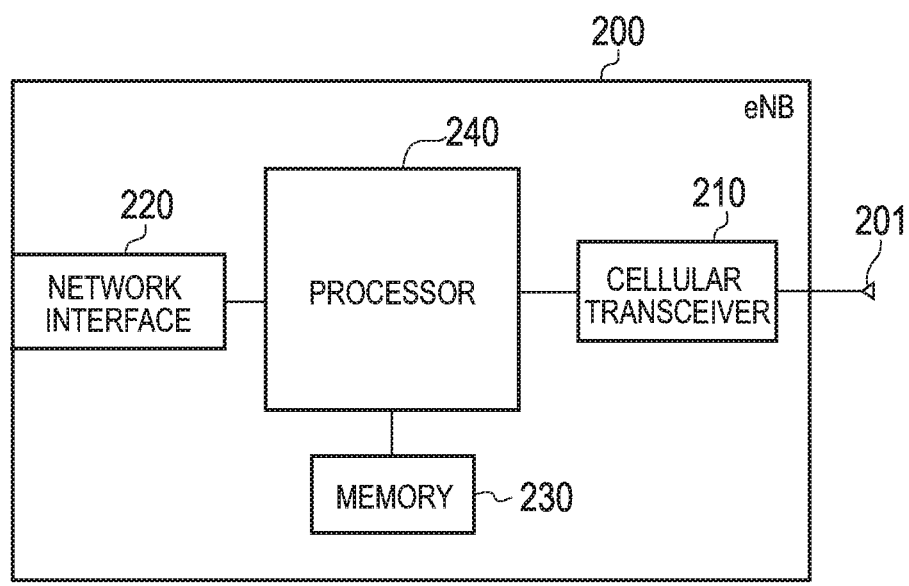

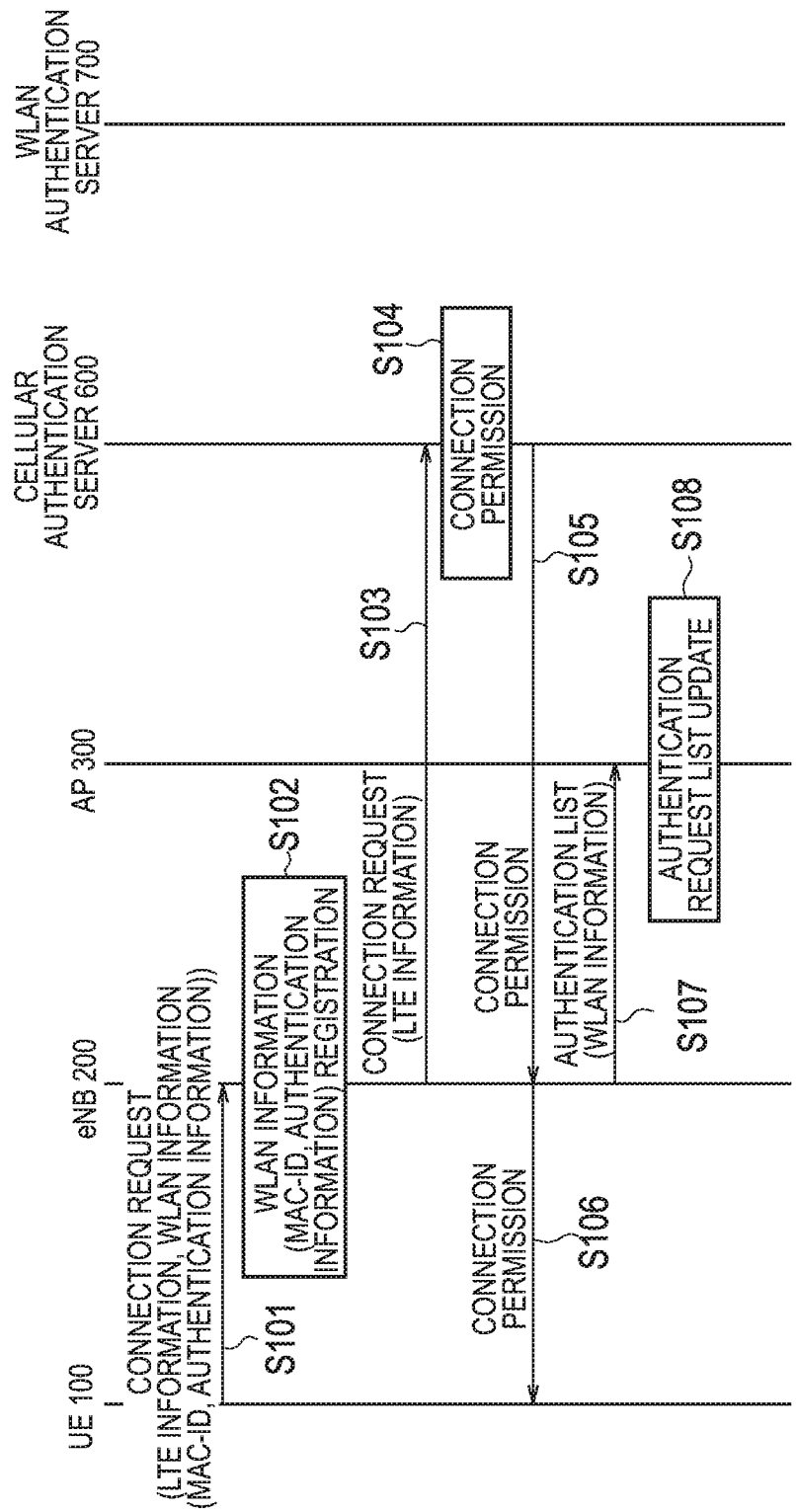

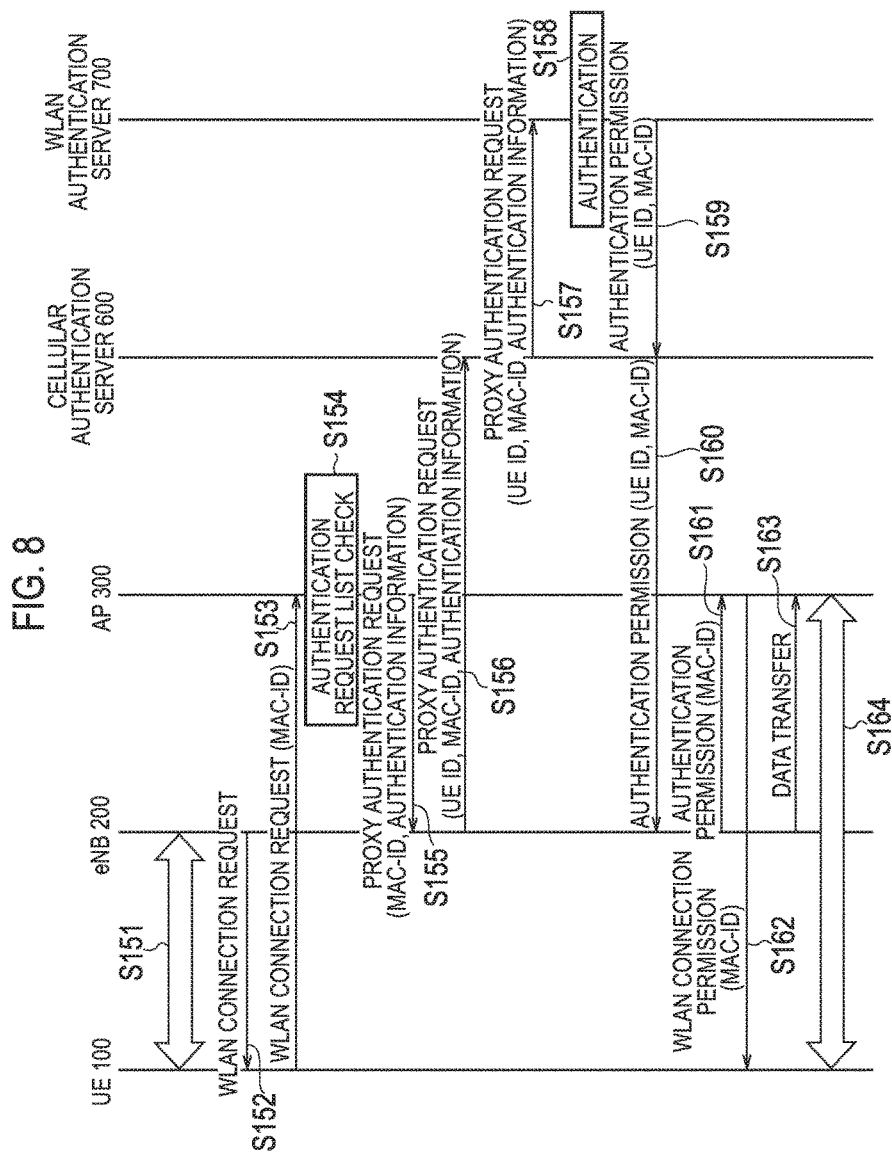

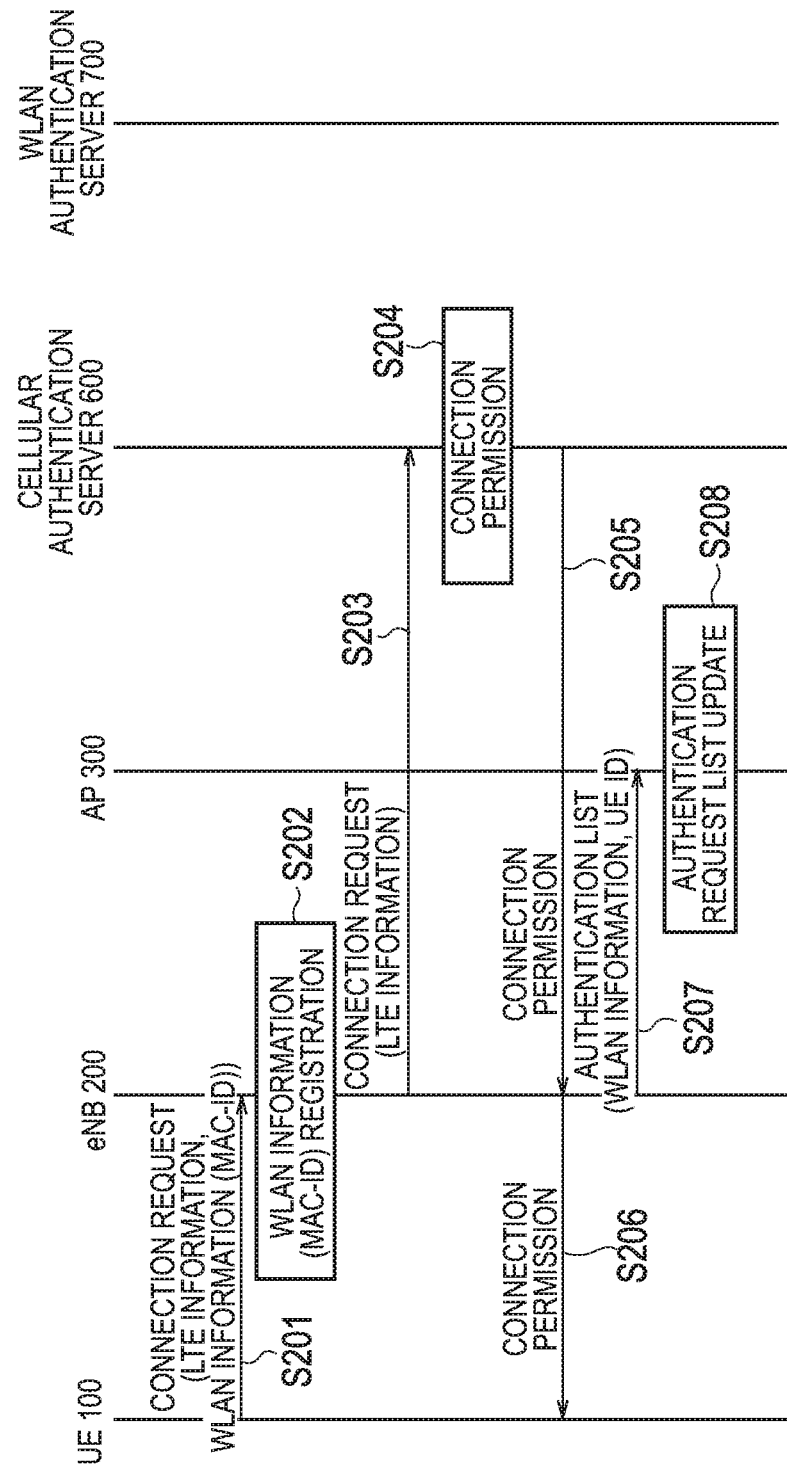

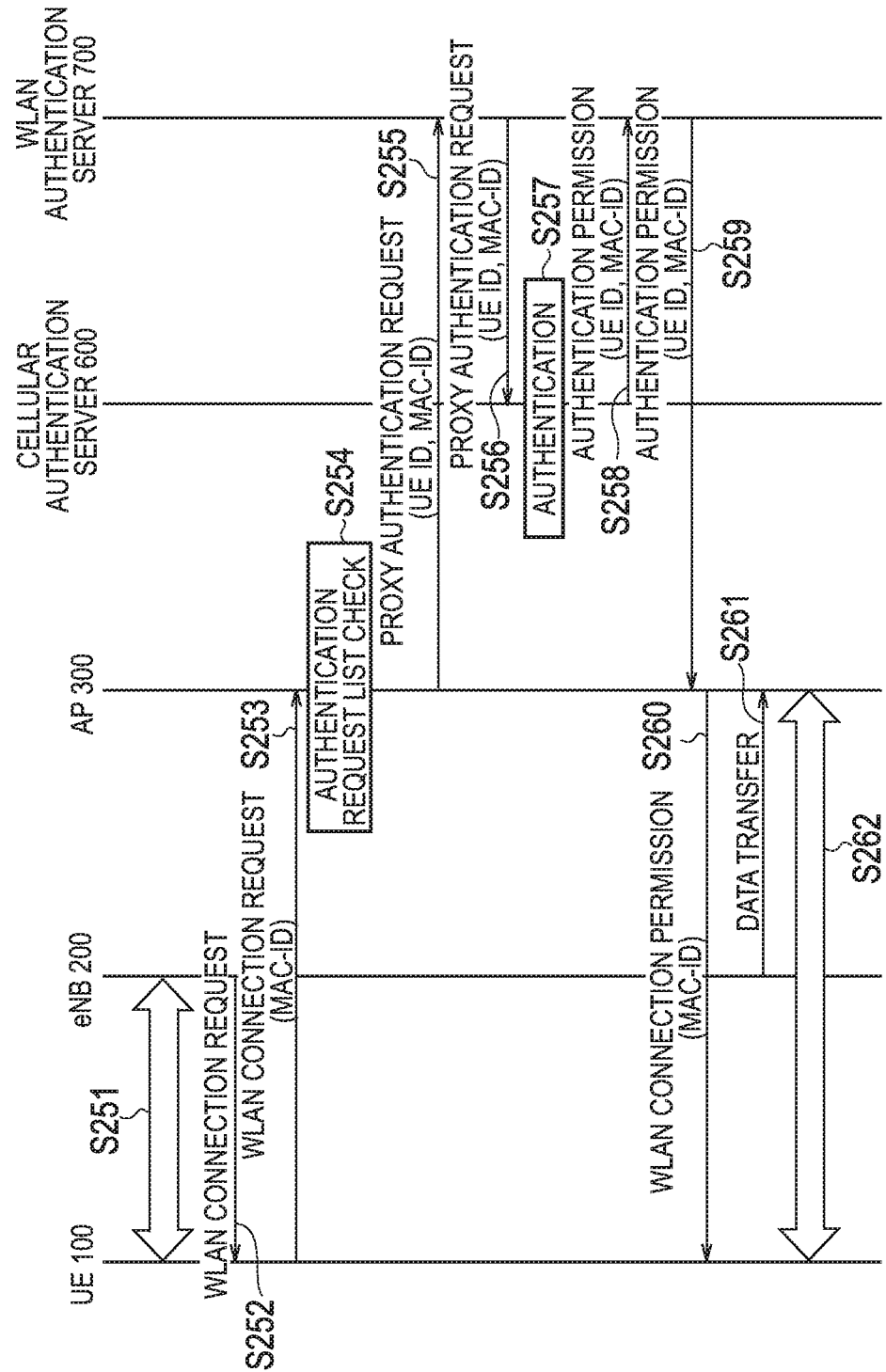

COMMUNICATION CONTROL METHOD, USER TERMINAL, CELLULAR BASE STATION, AND ACCESS POINT

CROSS REFERENCE TO RELATED APPLICATION

This application is a Continuation Application of U.S. patent application Ser. No. 14/786,732 filed on Oct. 23, 2015, which is a U.S. National Phase Application of International Patent Application No. PCT/JP2014/060593 filed on Apr. 14, 2014, which claims the benefit of Japanese Patent Application No. 2013-092181 filed on Apr. 25, 2013, the entire contents of which are incorporated herein by reference.

TECHNICAL FIELD

The present disclosure relates to a communication control method, a user terminal, a cellular base station, and an access point for allowing a cellular communication system to cooperate with a wireless LAN system.

BACKGROUND ART

In recent years, user terminals including a cellular transceiver and a wireless LAN transceiver (so-called dual terminals) have been becoming widespread. Wireless LAN access points managed by operators of cellular communication systems (hereinafter, simply referred to as "access points") have also been increasing.

Therefore, the 3rd Generation Partnership Project (3GPP), a standardization project for cellular communication systems, plans to study technologies capable of strengthening cooperation between cellular communication systems and wireless LAN systems (see Non Patent Literature 1).

For example, a method of switching traffic to be transmitted and received between a user terminal and a cellular base station to a wireless LAN system (i.e. offloading) to distribute traffic load of the cellular base station to the wireless LAN system is conceivable.

PRIOR ART DOCUMENT

Non-Patent Document

Non Patent Document 1: 3GPP Contributed Article RP-1201455

SUMMARY

However, under present circumstances, there is no authentication (wireless authentication and network authentication) arrangement for controlling connection between a user terminal and an access point involved in the above-described offloading. Thus it is difficult to realize smooth offloading.

Thus, the present disclosure provides a communication control method, a user terminal, a cellular base station, and an access point that allow realization of smooth offloading from a cellular base station to an access point.

A user terminal comprises: a controller including at least one processor and at least one memory, the controller configured to establish a connection to a Wireless Local Area Network (WLAN) while maintaining a RRC (Radio Resource Control) connection between the user terminal and a cellular base station, wherein the controller is further configured to transmit a WLAN MAC (Media Access Control) address of the user terminal to the cellular base station, receive from the cellular base station, an identifier of a WLAN access point included in the WLAN, and establish a WLAN connection to the WLAN access point corresponding to the identifier.

A cellular base station comprises: a controller including at least one processor and at least one memory, the controller configured to perform control to cause a user terminal maintaining a RRC (Radio Resource Control) connection with the cellular base station to establish a connection to a Wireless Local Area Network (WLAN), wherein the controller is further configured to receive, from the user terminal, a WLAN MAC (Media Access Control) address of the user terminal, and transmit, to a WLAN apparatus included in the WLAN, the WLAN MAC address of the user terminal and an identifier of the user terminal.

An apparatus to be provided in a user terminal, comprises: at least one processor and at least one memory, the processor configured to establish a connection to a Wireless Local Area Network (WLAN) while maintaining a RRC (Radio Resource Control) connection between the user terminal and a cellular base station, wherein the processor is further configured to transmit a WLAN MAC (Media Access Control) address of the user terminal to the cellular base station, receive from the cellular base station, an identifier of a WLAN access point included in the WLAN, and establish a WLAN connection to the WLAN access point corresponding to the identifier.

A communication control method, an user terminal, a cellular base station, and an access point according to the present disclosure, can be realize smooth offloading from the cellular base station to the access point.

BRIEF DESCRIPTION OF THE DRAWINGS

FIG. 1 is a system configuration diagram according to a first embodiment and a second embodiment.

FIG. 2 is a block diagram of a user terminal (UE) according to the first embodiment and the second embodiment.

FIG. 3 is a block diagram of a cellular base station (eNB) according to the first embodiment and the second embodiment.

FIG. 7 is a sequence diagram illustrating a preliminary operation according to the first embodiment.

FIG. 8 is a sequence diagram illustrating an offloading operation according to the first embodiment.

FIG. 9 is a sequence diagram illustrating a preliminary operation according to the second embodiment.

FIG. 10 is a sequence diagram illustrating an offloading operation according to the second embodiment.

DESCRIPTION OF THE EMBODIMENT

Overview of Embodiment

Figure 4:
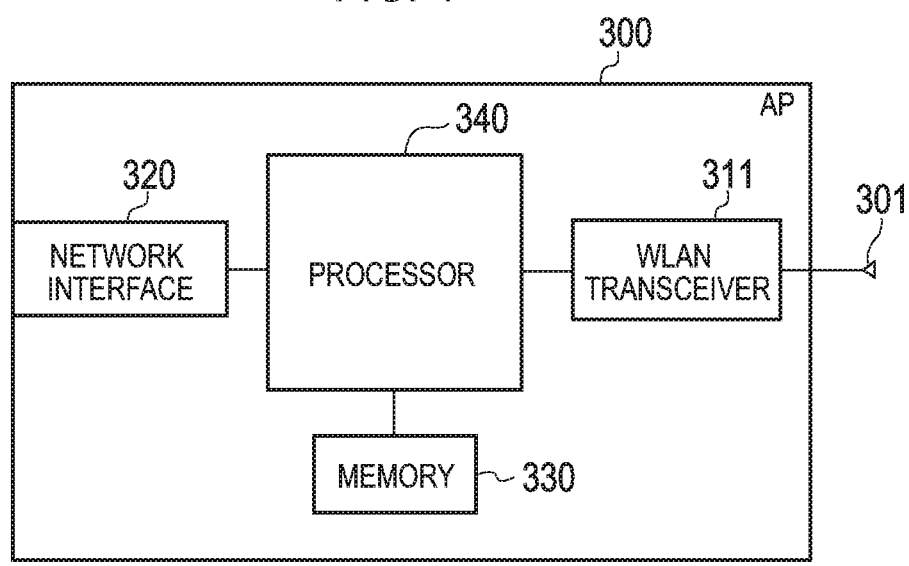
FIG. 4 is a block diagram of an access point (AP) according to the first embodiment and the second embodiment.

A communication control method according to a first embodiment and a second embodiment is a method for performing offloading to switch traffic to be transmitted and received between a user terminal and a cellular base station to a wireless LAN system. The communication control method comprises: a step A of transmitting, by the user terminal, a wireless LAN terminal identifier being an identifier of the user terminal in the wireless LAN system, to the cellular base station; and a step B of transmitting, by the cellular base station, the wireless LAN terminal identifier received from the user terminal to an access point of the wireless LAN system before performing the offloading. The wireless LAN terminal identifier is used for wireless authentication of the user terminal at the access point.

In the first embodiment and the second embodiment, the user terminal comprises a cellular transceiver and a wireless LAN transceiver. The wireless LAN terminal identifier is a MAC address assigned to the wireless LAN transceiver.

In the first embodiment and the second embodiment, in the step A, the user terminal includes the wireless LAN terminal identifier in a connection request to the cellular base station and transmits the wireless LAN terminal identifier.

In the first embodiment and the second embodiment, the communication control method further comprises: a step C of transmitting, by the cellular base station, a first connection request to request connection to the access point to the user terminal when the cellular base station performs the offloading; a step D of transmitting, by the user terminal, a second connection request including the wireless LAN terminal identifier to the access point, in response to reception of the first connection request; and a step E of completing the wireless authentication and starting a network authentication procedure for the user terminal when the wireless LAN terminal identifier received from the cellular base station corresponds to the wireless LAN terminal identifier included in the second connection request.

In the first embodiment, in the network authentication procedure, the access point performs an authentication request to a WLAN authentication server as proxy for the user terminal.

In the first embodiment, in the step A, the user terminal further transmits, to the cellular base station, network authentication information to be used for authentication of the user terminal by the WLAN authentication server. In the step B, the cellular base station further transmits the network authentication information received from the user terminal to the access point. In the network authentication procedure, the access point includes the network authentication information in the authentication request.

In the first embodiment, in the network authentication procedure, the access point performs the authentication request to the WLAN authentication server via the cellular base station and a cellular authentication server.

In the second embodiment, in the network authentication procedure, the access point performs an authentication request to a cellular authentication server as proxy for the user terminal.

In the second embodiment, in the step B, the cellular base station further transmits a cellular terminal identifier being an identifier of the user terminal in a cellular communication system, to the access point. In the network authentication procedure, the access point includes the cellular terminal identifier in the authentication request.

In the second embodiment, in the network authentication procedure, the access point performs the authentication request to the cellular authentication server via a WLAN authentication server.

A user terminal according to the first embodiment and the second embodiment is configured to comprise a cellular transceiver and a wireless LAN transceiver, and to connect to a cellular base station by the cellular transceiver. The user terminal comprises: a controller configured to control the cellular transceiver to transmit a wireless LAN terminal identifier being an identifier of the user terminal in a wireless LAN system, to the cellular base station. When the cellular transceiver receives, from the cellular base station, a first connection request to request connection to an access point of the wireless LAN system, the controller controls the wireless LAN transceiver to transmit a second connection request including the wireless LAN terminal identifier to the access point.

A cellular base station according to the first embodiment and the second embodiment is configured to connect to a user terminal comprising a cellular transceiver and a wireless LAN transceiver. The cellular base station comprises: a receiver configured to receive, from the user terminal, a wireless LAN terminal identifier being an identifier of the user terminal in a wireless LAN system; and a transmitter configured to transmit the wireless LAN terminal identifier to an access point of the wireless LAN system before offloading to switch traffic to be transmitted and received between the user terminal and the cellular base station to the wireless LAN system is performed. The wireless LAN terminal identifier is used for wireless authentication of the user terminal at the access point.

An access point according to the first embodiment and the second embodiment is an access point of a wireless LAN system. The access point comprises: a first receiver configured to receive, from a cellular base station, a wireless LAN terminal identifier being an identifier of a user terminal in the wireless LAN system; a second receiver configured to receive, from the user terminal, a connection request including the wireless LAN terminal identifier; and a controller configured to complete wireless authentication of the user terminal and start a network authentication procedure for the user terminal when the wireless LAN terminal identifier received from the cellular base station corresponds to the wireless LAN terminal identifier included in the connection request.

First Embodiment

Hereinafter, with reference to the accompanying drawings, the following description will be provided for each embodiment in a case where a cellular communication system (hereinafter, an "LTE system") configured in compliance with 3GPP standards cooperates with a wireless LAN (WLAN) system.

(System Configuration)

FIG. 1 is a configuration diagram of a system according to the first embodiment. As illustrated in FIG. 1, the cellular communication system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (a dual terminal) supporting communication methods of both a cellular communication and a WLAN communication.

The E-UTRAN 10 includes a plurality of eNBs 200 (evolved Node-Bs). The eNB 200 corresponds to a cellular base station. The eNB 200 controls a cell or a plurality of cells and performs radio communication with the UE 100 that establishes a connection with the cell. It is noted that the "cell" is used as a term indicating a minimum unit of a radio communication area, and is also used as a term indicating a function of performing radio communication with the UE 100. In addition, the eNB 200, for example, has a radio resource management (RRM) function, a routing function of user data, and a measurement control function for mobility control and scheduling.

The eNBs 200 are connected mutually via an X2 interface. Furthermore, the eNB 200 is connected to the MME/S-GW 300 included in the EPC 20 via an S1 interface.

The EPC 20 includes a plurality of MMEs (Mobility Management Entities)/S-GWs (Serving-Gateways) 500. The MME is a network node for performing various mobility controls, for example, for the UE 100 and corresponds to a control station. The S-GW is a network node that performs transfer control of user data and corresponds to a mobile switching center.

The WLAN system includes a WLAN AP (hereinafter, referred to as an "AP") 300. The WLAN system is configured in compliance with IEEE 802.11 standards, for example. The AP 300 performs communication with the UEs 100 in a frequency band (WLAN frequency band) different from a cellular frequency band. The AP 300 is connected to the EPC 20 via a router or the like.

Not limited to a case where an eNB 200 and an AP 300 are disposed separately, an eNB 200 and an AP 300 may be disposed in the same location (collocated). As a collocated form, an eNB 200 and an AP 300 may be connected directly by any interface of operator.

The EPC 20 further includes a cellular authentication server 600 configured to perform network authentication of the UEs 100 in the cellular communication system, and a WLAN authentication server 700 configured to perform network authentication of the UEs 100 in the WLAN system. When a UE 100 succeeds in network authentication by the cellular authentication server 600, the UE 100 becomes connectable to the cellular communication system. When a UE 100 succeeds in network authentication by the WLAN authentication server 700, the UE 100 becomes connectable to the WLAN system.

Next, the configurations of the UE 100, the eNB 200, and the AP 300 will be described.

FIG. 2 is a block diagram of the UE 100. As illustrated in FIG. 2, the UE 100 includes antennas 101 and 102, a cellular transceiver 111, a WLAN transceiver 112, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160' constituting a controller.

The antenna 101 and the cellular transceiver 111 are used for transmitting and receiving cellular radio signals. The cellular transceiver 111 converts a baseband signal output by the processor 160 to a cellular radio signal, and transmits it from the antenna 101. The cellular transceiver 111 also converts a cellular radio signal received by the antenna 101 to a baseband signal, and outputs it to the processor 160.

The antenna 102 and the WLAN transceiver 112 are used for transmitting and receiving WLAN radio signals. The WLAN transceiver 112 converts a baseband signal output by the processor 160 to a WLAN radio signal, and transmits it from the antenna 102. The WLAN transceiver 112 also converts a WLAN radio signal received by the antenna 102 to a baseband signal, and outputs it to the processor 160.

The WLAN transceiver 112 is assigned a MAC address as an identifier of the UE 100 in the WLAN system (hereinafter, referred to as a "WLAN MAC-ID"). WLAN radio signals transmitted and received by the WLAN transceiver 112 include the WLAN MAC-ID.

The user interface 120 is an interface with a user carrying the UE 100, and includes, for example, a display, a microphone, a speaker, various buttons and the like. The user interface 120 receives an input from a user and outputs a signal indicating the content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU that performs various processes by executing the program stored in the memory 150. The processor 160 may further include a codec that performs encoding and decoding of sound and video signals. The processor 160 implements various processes and various communication protocols described later.

FIG. 3 is a block diagram of the eNB 200. As illustrated in FIG. 3, the eNB 200 includes an antenna 201, a cellular transceiver 210, a network interface 220, a memory 230, and a processor 240. The memory 230 and the processor 240 constitute a controller. In addition, the memory 230 may be integrally formed with the processor 240, and this set (that is, a chipset) may be called a processor constituting a controller.

The antenna 201 and the cellular transceiver 210 are used to transmit and receive a radio signal. The cellular transceiver 210 converts a baseband signal output by the processor 240 to a cellular radio signal, and transmits it from the antenna 201. The cellular transceiver 210 also converts a cellular radio signal received by the antenna 201 to a baseband signal, and outputs it to the processor 240.

The network interface 220 is connected to the neighboring eNB 200 via the X2 interface and is connected to the MME/S-GW 500 via the S1 interface. Further, the network interface 220 is used in communication with the AP 300 via the EPC 20.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

FIG. 4 is a block diagram of the AP 300. As illustrated in FIG. 4, the AP 300 includes an antenna 301, a WLAN transceiver 311, a network interface 320, a memory 330, and a processor 340. The memory 330 and the processor 340 constitute a controller. In addition, the memory 330 may be integrally formed with the processor 340, and this set (that is, a chipset) may be called a processor constituting a controller.

The antenna 301 and the WLAN transceiver 311 are used to transmit and receive a radio signal. The WLAN transceiver 311 converts a baseband signal output by the processor 340 to a cellular radio signal, and transmits it from the antenna 301. The WLAN transceiver 311 also converts a cellular radio signal received by the antenna 301 to a baseband signal, and outputs it to the processor 340.

The network interface 320 is connected to the EPC 20 via a router. Further, the network interface 320 is used in communication with the eNB 200 via the EPC 20.

The memory 330 stores a program to be executed by the processor 340 and information to be used for a process by the processor 340. The processor 340 includes the baseband processor that performs modulation and demodulation, encoding and decoding and the like of the baseband signal and a CPU that performs various processes by executing the program stored in the memory 330.

Figure 5:
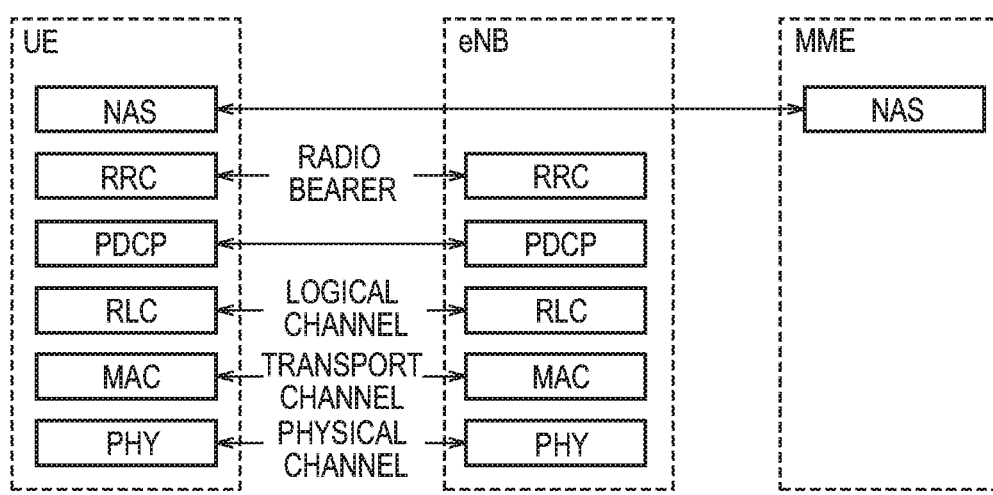
FIG. 5 is a protocol stack diagram of a wireless interface in an LTE system.

FIG. 5 is a protocol stack diagram of a radio interface in the cellular communication system. As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a scheduler for selecting a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a connected state (RRC connected state), and when the RRC connection is not established, the UE 100 is in an idle state (RRC idle state).

A NAS (Non-Access Stratum) layer positioned above the RRC layer performs session management and mobility management, for example.

Operation According to First Embodiment

Figure 6:
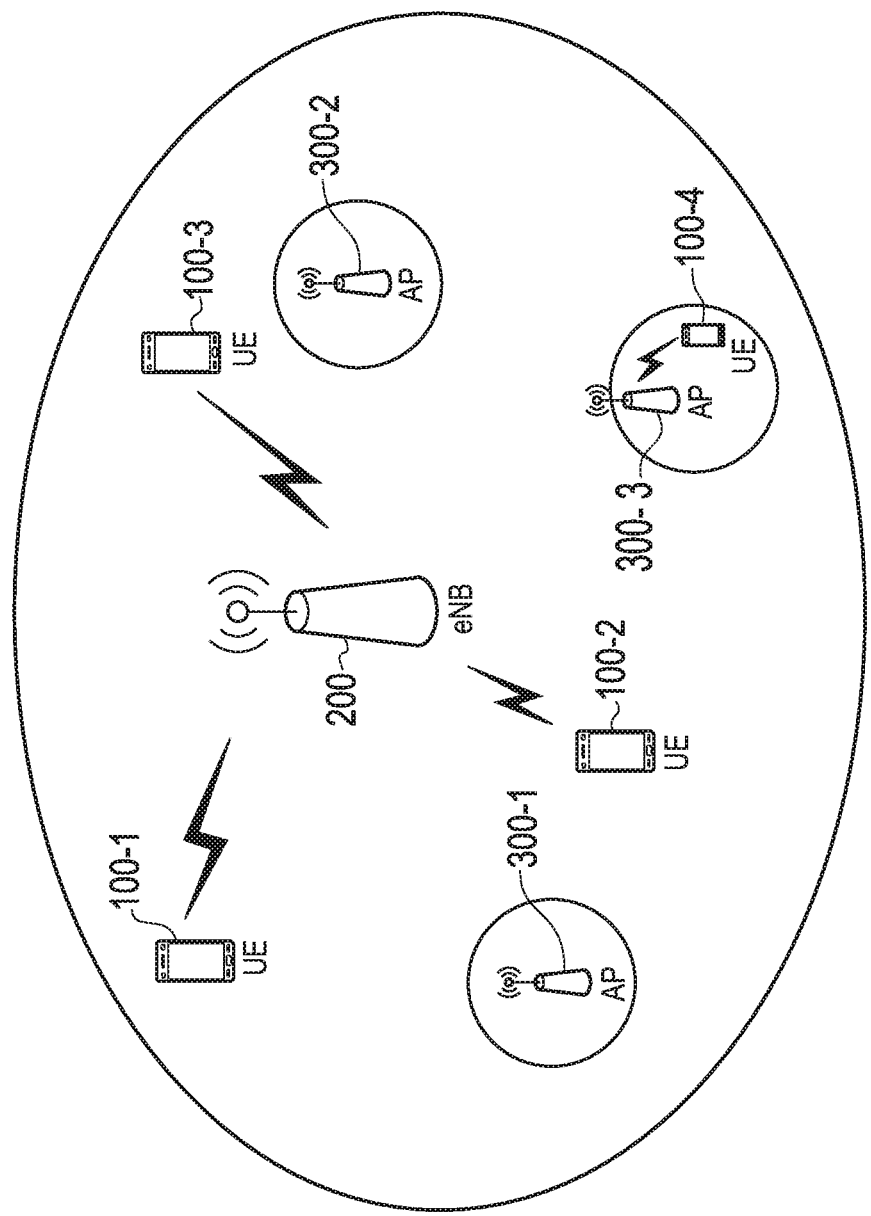
FIG. 6 is a diagram for illustrating an operating environment according to the first embodiment and the second embodiment.

Next, an operation according to the first embodiment will be described.
(1) Operating Environment
FIG. 6 is a diagram for illustrating an operating environment according to the first embodiment. As shown in FIG. 6, a plurality of APs 300 is provided in the coverage of an eNB 200. Each of the plurality of APs 300 is an AP controlled by an operator (operator controlled AP).

A plurality of UEs 100 is also located in the coverage of the eNB 200. UEs 100-1 to 100-3 are connected to the eNB 200, and perform cellular communication with the eNB 200. A UE 100-4 is connected to an AP 300-3, and performs WLAN communication with the AP 300-3.

When the eNB 200 receives a large number of UEs 100, the load level of the eNB 200 becomes high. Here the load level means the degree of congestion of the eNB 200 such as the traffic load of the eNB 200 or the radio resource usage rate of the eNB 200. Therefore, by switching at least part of traffic to be transmitted and received between the UEs 100 and the eNB 200 to the WLAN system, the traffic load of the eNB 200 can be distributed to the WLAN system.

The following is a description of an operation for switching traffic to be transmitted and received between a UE 100 and the eNB 200 to the WLAN system (hereinafter, referred to as "offloading"). Here offloading includes not only a case where all traffic to be transmitted and received between the UE 100 and the eNB 200 is switched to the WLAN system, but also a case where at least part of traffic is switched to the WLAN system while connection between the UE 100 and the eNB 200 is maintained.
(2) Preliminary Operation
FIG. 7 is a sequence diagram illustrating a preliminary operation according to the first embodiment. Here the preliminary operation is an operation performed at a point in time before offloading is started. In FIG. 7, the AP 300 is an AP 300 in the coverage of the eNB 200. In an initial state in FIG. 7, the UE 100 does not connect to either the eNB 200 or the AP 300.

As shown in FIG. 7, in step S101, the processor 160 of the UE 100 transmits a connection request to request connection to the eNB 200 from the cellular transceiver 111 to the eNB 200. The connection request includes information to be used for authentication in the WLAN system (WLAN information) in addition to information to be used for authentication in the cellular communication system (LTE information). The LTE information includes an identifier of the UE 100 (hereinafter, referred to as a "UE ID") in the cellular communication system and network authentication information on the UE 100 (authentication key) in the cellular communication system. The WLAN information includes a WLAN MAC-ID and network authentication information on the UE 100 (authentication key) in the WLAN system. The cellular transceiver 210 of the eNB 200 receives the connection request from the UE 100.

In step S102, the processor 240 of the eNB 200 stores (registers), in the memory 230, the WLAN information included in the connection request received by the cellular transceiver 210.

In step S103, the processor 240 of the eNB 200 transmits the LTE information included in the connection request received by the cellular transceiver 210 from the network interface 220 to the cellular authentication server 600. The cellular authentication server 600 receives the LTE information from the eNB 200.

In step S104, the cellular authentication server 600 performs network authentication of the UE 100, based on the LTE information from the eNB 200. Here, the description will proceed on the assumption that the authentication has been successful, and the cellular authentication server 600 has permitted connection between the UE 100 and the eNB 200.

In step S105, the cellular authentication server 600 transmits connection permission indicating permission of the connection to the eNB 200. The network interface 220 of the eNB 200 receives the connection permission.

In step S106, the processor 240 of the eNB 200 transmits the connection permission received by the network interface 220 from the cellular transceiver 210 to the UE 100. The cellular transceiver 111 of the UE 100 receives the connection permission from the eNB 200. The processor 160 of the UE 100 establishes connection with the eNB 200 (RRC connection), in response to the connection permission received by the cellular transceiver 111.

In step S107, the processor 240 of the eNB 200 transmits the WLAN information (including the WLAN MAC-ID) on the UE 100 stored in the memory 230 from the network interface 220 to the AP 300. The network interface 320 of the AP 300 receives the WLAN information from the eNB 200.

In step S108, the processor 340 of the AP 300 stores (registers) the WLAN information received by the network interface 320 in the memory 330. The processor 340 of the AP 300 manages the WLAN information received from the eNB 200 as an authentication request list.

(3) Offloading Operation

FIG. 8 is a sequence diagram illustrating an offloading operation according to the first embodiment.

As shown in FIG. 8, in step S151, the UE 100 is in a state of having established connection with the eNB 200 (connected state).

In step S152, the processor 240 of the eNB 200 transmits a WLAN connection request (first connection request) to request connection to the WLAN system (AP 300) from the cellular transceiver 210 to the UE 100. The WLAN connection request (first connection request) may include information on the AP 300 to which the UE 100 is expected to connect (such as an AP identifier). The cellular transceiver 111 of the UE 100 receives the WLAN connection request (first connection request) from the eNB 200.

In step S153, in response to the WLAN connection request (first connection request) received by the cellular transceiver 111, the processor 160 of the UE 100 transmits a WLAN connection request (second connection request) to request connection with the AP 300 from the WLAN transceiver 112 to the AP 300. The WLAN connection request (second connection request) includes the WLAN MAC-ID. The WLAN transceiver 311 of the AP 300 receives the WLAN connection request (second connection request) from the UE 100.

In step S154, the processor 340 of the AP 300 checks whether or not the WLAN MAC-ID included in the WLAN connection request (second connection request) received by the WLAN transceiver 311 corresponds to the WLAN MAC-ID included in the authentication request list stored in the memory 330. When the WLAN MAC-IDs correspond to each other, the processor 340 recognizes that the UE 100 is the UE 100 involved in offloading from the eNB 200. Further, when the WLAN MAC-IDs correspond to each other, the processor 340 completes the wireless authentication of the UE 100, permits connection of the UE 100 at a radio level, and starts a network authentication procedure. Here, the description will proceed on the assumption that the WLAN MAC-IDs corresponds to each other.

In step S155, the processor 340 of the AP 300 transmits, from the network interface 320 to the eNB 200, a proxy authentication request being an authentication request which the processor 340 performs as proxy for the UE 100. The proxy authentication request includes WLAN information corresponding to the WLAN MAC-ID corresponding in step S154. The network interface 220 of the eNB 200 receives the proxy authentication request from the AP 300.

In step S156, the processor 240 of the eNB 200 adds the UE ID of the UE 100 to the proxy authentication request received by the network interface 220, and transmits the proxy authentication request to which the UE ID has been added from the network interface 220 to the cellular authentication server 600. The cellular authentication server 600 receives the proxy authentication request from the eNB 200.

In step S157, the cellular authentication server 600 transfers the proxy authentication request from the eNB 200 to the WLAN authentication server 700. In other words, the cellular authentication server 600 sends out an authentication request (proxy authentication request) in place of the UE 100 to the WLAN authentication server 700.

In step S158, the WLAN authentication server 700 performs authentication of the UE 100 (network authentication), based on the proxy authentication request from the cellular authentication server 600. When the WLAN authentication server 700 verifies the validity of the UE 100 through the network authentication information (authentication key) included in the proxy authentication request, it makes the authentication successful. Here, the description will proceed on the assumption that the authentication in the WLAN authentication server 700 has been successful.

In step S159, the WLAN authentication server 700 transmits an authentication result (authentication permission indicating success of the network authentication) to the cellular authentication server 600. The authentication permission includes the UE ID and the WLAN MAC-ID. The cellular authentication server 600 receives the authentication permission from the WLAN authentication server 700.

In step S160, the cellular authentication server 600 transfers the authentication permission from the WLAN authentication server 700 to the eNB 200. The network interface 220 of the eNB 200 receives the authentication permission from the cellular authentication server 600.

In step S161, in response to the authentication permission received by the network interface 220, the processor 240 of the eNB 200 transmits authentication permission including the WLAN MAC-ID from the network interface 220 to the AP 300. The network interface 320 of the AP 300 receives the authentication permission from the eNB 200.

In step S162, the processor 340 of the AP 300 transmits WLAN connection permission to permit connection with the AP 300 from the WLAN transceiver 311 to the UE 100. The WLAN connection permission includes the WLAN MAC-ID. The WLAN connection permission may also include information specifying traffic to be offloaded (such as bearer identification information). The WLAN transceiver 112 of the UE 100 receives the WLAN connection permission from the AP 300.

In step S163, the processor 240 of the eNB 200 transmits traffic not having been transmitted to the UE 100 (non-transmitted data) of traffic associated with offloading from the network interface 220 to the AP 300.

In step S164, the processor 160 of the UE 100 establishes connection with the AP 300, in response to the WLAN connection permission received by the WLAN transceiver 112, and transmits and receives traffic associated with offloading to and from the AP 300.

(4) Summary

The UE 100 includes the WLAN MAC-ID in a connection request and transmits it to the eNB 200. The eNB 200, before performing offloading, transmits the WLAN MAC-ID received from the UE 100 to the AP 300 in the WLAN system. The WLAN MAC-ID is used for wireless authentication of the UE 100 in the AP 300. Thus, when offloading is performed, wireless authentication between the UE 100 and the AP 300 can be completed promptly.

The eNB 200, when performing offloading, transmits a first connection request to request connection to the AP 300 to the UE 100. In response to the reception of the first connection request, the UE 100 transmits a second connection request including the WLAN MAC-ID to the AP 300. When the WLAN MAC-ID received from the eNB 200 corresponds to the WLAN MAC-ID included in the second connection request, the AP 300 completes the wireless authentication, and starts the network authentication procedure for the UE 100. Thus, wireless authentication between the UE 100 and the AP 300 can be completed promptly to start the network authentication procedure.

In the first embodiment, in the network authentication procedure, the AP 300 performs an authentication request to the WLAN authentication server 700 as proxy for the UE 100. This eliminates the need for an authentication request performed from the UE 100 when the UE 100 connects to the AP 300, thus the network authentication procedure can be started promptly.

In the first embodiment, when the UE 100 connects to the eNB 200, it transmits, to the eNB 200, the network authentication information to be used for authentication of the UE 100 by the WLAN authentication server 700. The eNB 200, before performing offloading, transmits the network authentication information received from the UE 100 to the AP 300. Then, in the network authentication procedure, the AP 300 includes the network authentication information in an authentication request. This eliminates the need for transmission of the network authentication information from the UE 100 when the UE 100 connects to the AP 300. It is common for the network authentication information to be manually input by a user of the UE 100. Such manual input can be omitted, so that the network authentication procedure can be started promptly, and in addition, the convenience of the user can be improved.

In the first embodiment, in the network authentication procedure, the AP 300 performs an authentication request to the WLAN authentication server 700 via the eNB 200 and the cellular authentication server 600. This allows it to request authentication to the WLAN authentication server 700 as proxy for the UE 100 via the cellular authentication server 600.

Second Embodiment

A second embodiment will be described mainly on differences from the first embodiment. A system configuration and an operating environment according to the second embodiment are the same as the first embodiment, but a preliminary operation and an offloading operation according to the second embodiment are partly different from those in the first embodiment.

(1) Preliminary Operation

FIG. 9 is a sequence diagram illustrating a preliminary operation according to the second embodiment.

As shown in FIG. 9, in step S201, a processor 160 of an UE 100 transmits a connection request to request connection to an eNB 200 from a cellular transceiver 111 to the eNB 200. The connection request includes information to be used for authentication in a WLAN system (WLAN information) in addition to information to be used for authentication in a cellular communication system (LTE information). The LTE information includes a UE ID and network authentication information on the UE 100 (authentication key) in the cellular communication system. The WLAN information includes a WLAN MAC-ID. A cellular transceiver 210 of the eNB 200 receives the connection request from the UE 100.

In step S202, a processor 240 of the eNB 200 stores (registers), in memory 230, the WLAN information included in the connection request received by the cellular transceiver 210.

In step S203, the processor 240 of the eNB 200 transmits the LTE information included in the connection request received by the cellular transceiver 210 from a network interface 220 to a cellular authentication server 600. The cellular authentication server 600 receives the LTE information from the eNB 200.

In step S204, the cellular authentication server 600 performs network authentication of the UE 100, based on the LTE information from the eNB 200. Here, the description will proceed on the assumption that the authentication has been successful, and the cellular authentication server 600 has permitted connection between the UE 100 and the eNB 200.

In step S205, the cellular authentication server 600 transmits connection permission indicating permission of the connection to the eNB 200. The network interface 220 of the eNB 200 receives the connection permission.

In step S206, the processor 240 of the eNB 200 transmits the connection permission received by the network interface 220 from the cellular transceiver 210 to the UE 100. The cellular transceiver 111 of the UE 100 receives the connection permission from the eNB 200. A processor 160 of the UE 100 establishes connection with the eNB 200 (RRC connection), in response to the connection permission received by the cellular transceiver 111.

In step S207, the processor 240 of the eNB 200 transmits the WLAN information on the UE 100 (WLAN MAC-ID) stored in the memory 230 and the UE ID of the UE 100 from the network interface 220 to an AP 300. A network interface 320 of the AP 300 receives the WLAN information (WLAN MAC-ID) and the UE ID from the eNB 200.

In step S208, a processor 340 of the AP 300 stores (registers) the WLAN information (WLAN MAC-ID) and the UE ID received by the network interface 320 in a memory 330. The processor 340 of the AP 300 manages the WLAN information (WLAN MAC-ID) and the UE ID received from the eNB 200 as an authentication request list.

(2) Offloading Operation

FIG. 10 is a sequence diagram illustrating an offloading operation according to the second embodiment.

As shown in FIG. 10, in step S251, the UE 100 is in a state of having established connection with the eNB 200 (connected state).

In step S252, the processor 240 of the eNB 200 transmits a WLAN connection request to request connection to the WLAN system (AP 300) (first connection request) from the cellular transceiver 210 to the UE 100. The WLAN connection request (first connection request) may include information on the AP 300 to which the UE 100 is expected to connect (such as an AP identifier). The cellular transceiver 111 of the UE 100 receives the WLAN connection request (first connection request) from the eNB 200.

In step S253, in response to the WLAN connection request (first connection request) received by the cellular transceiver 111, the processor 160 of the UE 100 transmits a WLAN connection request to request connection with the AP 300 (second connection request) from a WLAN transceiver 112 to the AP 300. The WLAN connection request (second connection request) includes the WLAN MAC-ID.

A WLAN transceiver 311 of the AP 300 receives the WLAN connection request (second connection request) from the UE 100.

In step S254, the processor 340 of the AP 300 checks whether or not the WLAN MAC-ID included in the WLAN connection request (second connection request) received by the WLAN transceiver 311 corresponds to the WLAN MAC-ID included in the authentication request list stored in the memory 330. When the WLAN MAC-IDs correspond to each other, the processor 340 recognizes that the UE 100 is the UE 100 involved in offloading from the eNB 200. Further, when WLAN MAC-IDs correspond to each other, the processor 340 completes the wireless authentication of the UE 100, permits connection of the UE 100 at a radio level, and starts a network authentication procedure. Here, the description will proceed on the assumption that the WLAN MAC-IDs correspond to each other.

In step S255, the processor 340 of the AP 300 transmits, from the network interface 320 to the AP 300, a proxy authentication request being an authentication request which the processor 340 performs as proxy for the UE 100. The proxy authentication request includes the WLAN MAC-ID corresponding in step S254 and the UE ID associated with the WLAN MAC-ID. The WLAN authentication server 700 receives the proxy authentication request from the AP 300.

In step S256, the WLAN authentication server 700 transfers, to the cellular authentication server 600, the proxy authentication request received from the AP 300. The cellular authentication server 600 receives the proxy authentication request from the WLAN authentication server 700.

In step S257, the cellular authentication server 600 performs network authentication of the UE 100, based on the proxy authentication request from the WLAN authentication server 700. For example, when the cellular authentication server 600 verifies, through the UE ID, that it is the UE 100 that has been permitted to connect to the eNB 200 (i.e. the UE 100 involved in offloading), it makes the authentication successful. Here, the description will proceed on the assumption that the authentication in the cellular authentication server 600 has been successful.

In step S258, in response to the authentication success, the cellular authentication server 600 transmits, to the WLAN authentication server 700, authentication permission indicating success of the network authentication. The authentication permission includes the UE ID and the WLAN MAC-ID. The WLAN authentication server 700 receives the authentication permission from the cellular authentication server 600.

In step S259, the WLAN authentication server 700 transfers the authentication permission from the cellular authentication server 600 to the AP 300. The network interface 320 of the AP 300 receives the authentication permission from the WLAN authentication server 700.

In step S260, in response to the authentication permission received by the network interface 320, the processor 340 of the AP 300 transmits WLAN connection permission to permit connection with the AP 300 from the WLAN transceiver 311 to the UE 100. The WLAN connection permission includes the WLAN MAC-ID. The WLAN connection permission may also include information specifying traffic to be offloaded (such as bearer identification information). The WLAN transceiver 112 of the UE 100 receives the WLAN connection permission from the AP 300.

In step S261, the processor 240 of the eNB 200 transmits traffic not having been transmitted to the UE 100 (non-transmitted data) of traffic associated with offloading from the network interface 220 to the AP 300.

In step S262, the processor 160 of the UE 100 establishes connection with the AP 300, in response to the WLAN connection permission received by the WLAN transceiver 112, and transmits and receives traffic associated with offloading to and from the AP 300.

(3) Summary

Thus, in the second embodiment, in the network authentication procedure, the AP 300 performs an authentication request to the cellular authentication server 600 as proxy for the UE 100. This eliminates the need for an authentication request performed from the UE 100 when the UE 100 connects to the AP 300, thus the network authentication procedure can be started promptly.

In the second embodiment, the eNB 200, before performing offloading, transmits the UE ID (cellular terminal identifier), an identifier of the UE 100 in the cellular communication system, to the AP 300. Then, in the network authentication procedure, the AP 300 includes the UE ID in an authentication request. This allows use of the UE ID for authentication in place of the network authentication information in the WLAN when the UE 100 connects to the AP 300. It is common for the network authentication information to be manually input by a user of the UE 100. Such manual input can be omitted, so that the network authentication procedure can be started promptly, and in addition, the convenience of the user can be improved.

In the second embodiment, in the network authentication procedure, the AP 300 performs an authentication request to the cellular authentication server 600 via the WLAN authentication server 700. This allows it to request authentication to the cellular authentication server 600 as proxy for the UE 100 via the WLAN authentication server 700.

Other Embodiments

In the above-described embodiments, the UE 100 includes the WLAN MAC-ID in a connection request to the eNB 200 for transmission. However, the UE 100 may transmit the WLAN MAC-ID to the eNB 200 separately from a connection request to the eNB 200. For example, the UE 100 may transmit the WLAN MAC-ID to the eNB 200 in response to a request from the eNB 200 after establishing connection with the eNB 200.

In the above-described embodiments, the LTE system has been described as one example of the cellular communication system. However, the present disclosure may also be applied to systems, other than the LTE system, as well as the LTE system.

INDUSTRIAL APPLICABILITY

As described above, the communication control method, the user terminal, the cellular base station, and the access point according to the present disclosure, can be realize smooth offloading from the cellular base station to the access point; and thus they are useful in a mobile communication field.

The invention claimed is:
1. A cellular base station comprising:
a controller including at least one processor and at least one memory, the controller configured to cause a user terminal maintaining a RRC (Radio Resource Control) connection with the cellular base station to establish a connection to a Wireless Local Area Network (WLAN), wherein the controller is further configured to
- receive, from the user terminal, a WLAN MAC (Media Access Control) address of the user terminal, and
- transmit, to a WLAN apparatus included in the WLAN, the WLAN MAC address of the user terminal together with authentication information of the user terminal, wherein the authentication information indicates a WLAN authentication key for authentication of the user terminal in the WLAN.

2. The cellular base station according to claim 1, wherein the controller is further configured to
- transmit to the user terminal, a request message that request the user terminal to transmit information including the WLAN MAC address to the cellular base station, and
- in response to transmission of the request message, receive the information including the WLAN MAC (Media Access Control) address of the user terminal.

3. The cellular base station according to claim 1, wherein the controller is further configured to
- transmit an identifier of a WLAN access point included in the WLAN, and
- cause the user terminal to establish a WLAN connection to the WLAN access point corresponding to the identifier.

4. The cellular base station according to claim 1, wherein the controller is further configured to transmit data that has not been transmitted to the user terminal, to the WLAN apparatus.

5. An apparatus to be provided in a cellular base station, comprising:
- at least one processor and at least one memory, the processor configured to cause a user terminal maintaining a RRC (Radio Resource Control) connection with the cellular base station to establish a connection to a Wireless Local Area Network (WLAN), wherein the processor is further configured to
- receive, from the user terminal, a WLAN MAC (Media Access Control) address of the user terminal, and
- transmit, to a WLAN apparatus included in the WLAN, the WLAN MAC address of the user terminal together with authentication information of the user terminal, wherein the authentication information indicates a WLAN authentication key for authentication of the user terminal in the WLAN.

6. A communication control method for controlling a mobile communication system including a user terminal that establishes a connection to a Wireless Local Area Network (WLAN) while maintaining a RRC (Radio Resource Control) connection between the user terminal and a cellular base station, the communication control method comprising:
- transmitting, by the user terminal, to the cellular base station, a WLAN MAC (Media Access Control) address of the user terminal;
- transmitting, by the cellular base station, to a WLAN apparatus included in the WLAN, the WLAN MAC address of the user terminal together with authentication information of the user terminal, wherein the authentication information indicates a WLAN authentication key for authentication of the user terminal in the WLAN;
- receiving, by the user terminal, from the cellular base station, an identifier of a WLAN access point included in the WLAN, and
- establishing, by the user terminal, a WLAN connection to the WLAN access point corresponding to the identifier.

* * * * *